No. 888,937. PATENTED MAY 26, 1908.
A. R. SCOTT.
JOURNAL BEARING PACKING.
APPLICATION FILED SEPT. 17, 1906.
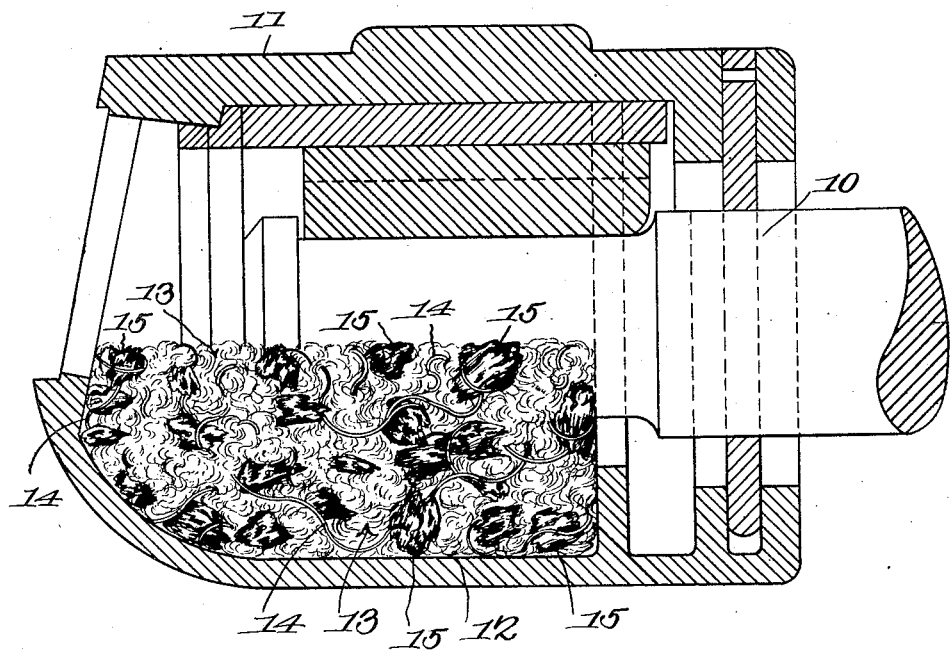
Ada R. Scott,
Inventor
Witnesses
by
Attorneys

UNITED STATES PATENT OFFICE.

ADA ROGERS SCOTT, OF CHICAGO, ILLINOIS.

JOURNAL-BEARING PACKING.

No. 888,937.  Specification of Letters Patent.  Patented May 26, 1908.

Application filed September 17, 1906. Serial No. 334,898.

*To all whom it may concern:*

Be it known that I, ADA ROGERS SCOTT, a citizen of the United States, residing at Chicago, in the county of Cook and State of Illinois, have invented a new and useful Journal-Bearing Packing, of which the following is a specification.

This invention relates to the packing for journal bearings, to retain the lubricating material and apply the same continuously to the bearings, and has for its object to provide a packing composed of certain materials or substances which when combined and commingled possess the power of absorbing the lubricating material and transmitting the same uniformly and continuously to the bearings, and thus obviating the danger of the bearing becoming heated by the friction.

With these and other objects in view, which will appear as the nature of the invention is better understood, the same consists in certain novel features of construction as hereinafter fully described and claimed.

In the accompanying drawings, forming a part of this specification, the figure represents a conventional form of railway axle box, and one of the axle journals with the improved packing disposed in the box and bearing upon the journal.

The improved packing herein described and shown may be employed effectually for all the various journals of machinery of different kinds but is more particularly adapted for car axles, locomotive bearings, automobile axles, dynamo and motor bearings and similar structures where the bearings are required to support heavy loads and sustain correspondingly severe frictional strains, and consists of a freely intermingled mass composed of cotton waste or fiber usually employed in journal boxes and which constitutes a capillary conductor, metal shavings, preferably steel, which constitute a non-absorbent pressure-exerting and anti-packing concomitant and pieces of sponge or like material, which constitute emulsive absorbents to occlude the lubricant and supply the same to the capillary conductor and thus to the bearing continuously and uniformly.

In practice the journal bearing, as for instance a car axle journal as at 10, is incased in the box or casing 11 with the usual well 12 for the lubricant, and the improved compound of waste, metal shavings, and sponge inserted in the well and saturated with the lubricating compound.

The waste material is indicated at 13, the metal shavings at 14 and the pieces of sponge at 15, and will be thoroughly commingled to present a uniform and homogeneous mass. This compound possesses the power of causing the liquid or semi-liquid lubricating material to pass upward therethrough by capillary force, the metal material together with the waste material causing the lubricant to freely flow upward therethrough while the sponge pieces absorb the lubricant which expands the same and thus supplies a larger quantity and passes it to the journal with sufficient profusion to maintain the same constantly lubricated and thereby effectually prevents any tendency of the journal to become heated, no matter how heavy the load may be. This compound of material may be inexpensively manufactured and operates effectually for the purposes described.

The metal shavings by their resilience support the waste and sponge yieldably against the journal bearing and effectually prevent any tendency of the parts to pack or become sagged in the well portion of the box or casing, while the sponge pieces by absorbing a larger quantity of the lubricant, very materially increase the effectiveness of the packing.

The capillary qualities of the compound are thus materially increased by the coaction of the various ingredients, and its effectiveness as a packing correspondingly increased.

Having thus described the invention, what is claimed is:—

1. A journal packing comprising a freely intermingled mass composed of an emulsive absorbent, a capillary conductor, and a non-absorbent pressure-exerting and anti-packing material.

2. A journal packing comprising a freely intermingled mass composed of waste, pieces of sponge, and metallic shavings.

In testimony that I claim the foregoing as my own, I have hereto affixed my signature in the presence of two witnesses.

ADA ROGERS SCOTT.

Witnesses:
R. J. BUSCH,
LOURENA SCHRYVER.